United States Patent [19]
Ohta et al.
[11] 3,909,527
[45] Sept. 30, 1975

[54] FREQUENCY SHIFT KEYING SYSTEM AND METHOD

[75] Inventors: Takahisa Ohta; Shigeo Sugimura, both of Amagasaki, Japan
[73] Assignee: Mitsubishi Denki Kabushiki Kaisha, Tokyo, Japan

[22] Filed: Sept. 18, 1973
[21] Appl. No.: 398,463

[52] U.S. Cl. .................. 178/66 R; 325/30
[51] Int. Cl. .................. H04b 1/00; H04b 7/00
[58] Field of Search .................. 178/66 R, 67; 325/30

[56] References Cited
UNITED STATES PATENTS
3,493,865 2/1970 Miller .................. 325/30

*Primary Examiner*—R. Stephen Dildine, Jr.
*Attorney, Agent, or Firm*—Oblon, Fisher, Spivak, McClelland & Maier

[57] ABSTRACT

A frequency shift keying method which comprises the steps of transmitting N signals having different shift patterns which correspond to N code elements and whose frequency is varied in the entire allocated frequency band during one clock period, comparing N heterodyne detector outputs provided by N local signals for receiving, having each frequency shift pattern synchronized to N transmitting signals, each of said local signals having a constant frequency difference from the transmitting signals, and detecting the heterodyne detector circuit having the maximum output whereby the transmitted code element is detected and reproduced.

9 Claims, 5 Drawing Figures

FREQUENCY SHIFT KEYING SYSTEM AND METHOD

BACKGROUND OF THE INVENTION

1. Field of the Invention:

This invention relates to Frequency Shift Keying System, and more particularly to an FSK system in which multifrequency waves including a mark code signal and a space code signal are simultaneously transmitted.

2. Description of the Prior Art:

Frequency shift keying systems, hereinafter referred to as FSK systems, have usually been employed for transmission of teletype or data in high frequency (HF) band. In a HF band, deficiencies involving selective fading and interference (jamming) disturbances have sometime been encountered.

In order to overcome such deficiencides, a diversity in band has been utilized. That is, two or more frequencies in each band have been assigned to a mark code and a space code, and multifrequency waves have been simultaneously transmitted so as to perform a diversity composition in a receiver to determine whether the mark code or the space code is present.

In a conventional diversity system in frequency shift keying bands, two or more frequency waves are simultaneously transmitted so that the transmitter peak power is much higher than the transmitter average power. In general, the final stage power amplifier is limited by its peak power. When the same final stage power amplifier is employed, the transmitter average power when diversity is employed is lower than that in the case of employing no diversity. Accordingly, even though diversity is used, the effect of the diversity cannot be advantageously imparted.

SUMMARY OF THE INVENTION

A primary object of the present invention is to overcome the foregoing disadvantages by providing a frequency shift keying system and method having a effect of diversity in band and which is minimally effected by selective fading and interference disturbances and in which the transmitter peak power is same as the transmitter average power.

The foregoing and other objects are attained in accordance with one aspect of the present invention through the provision of a frequency shift keying system and method which comprises transmitting N types of signals having different shift patterns which correspond to N values of code elements ($N \geqslant 2$) and whose frequency is varied in the entire allocated frequency band during one clock period, comparing N heterodyne detector outputs provided by N local signals for receiving, having each frequency shift pattern synchronized to N transmitting signals, and said local signals each having a constant frequency difference from the transmitting signals, and detecting the heterodyne detector circuit having the maximum output, whereby the transmitted code element is detected and reproduced.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENT

Figure 1:
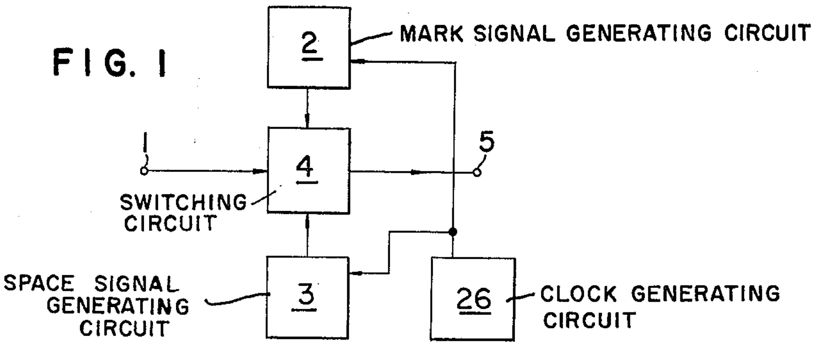
FIG. 1 is a schematic block diagram of one embodiment of a modulator used in the present invention.

Referring now to the drawings, wherein like reference numerals designate identical or corresponding parts throughout the several views, and more particularly to FIG. 1 thereof, there is illustrated a modulator for use in the present invention which comprises a data input terminal 1, a mark signal generating circuit 2, a space signal generating circuit 3, a switching circuit 4, a shifted signal output terminal 5 and a clock generating circuit 26.

Figure 2:
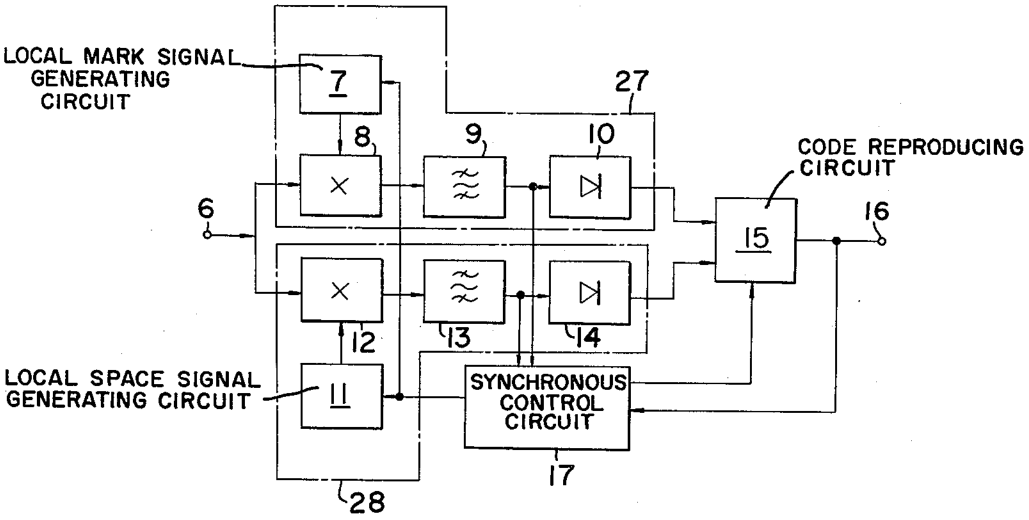
FIG. 2 is a schematic block diagram of one embodiment of a demodulator used in the present invention.

FIG. 2 shows a demodulator for use in the present invention which comprises a shifted transmitted signal input terminal 6, a local mark signal generating circuit 7, mixers 8 and 12, band-pass filters 9 and 13, envelope detectors 10 and 14, a local space signal generating circuit 11, a code reproducing circuit 15, a reproduced data output terminal 16, and a synchronous control circuit 17. Components 7 through 10 form a superheterodyne detecting circuit for the mark signals 27, and components 11 through 14 form a superheterodyne detecting circuit for the space signals 28.

Figure 3:
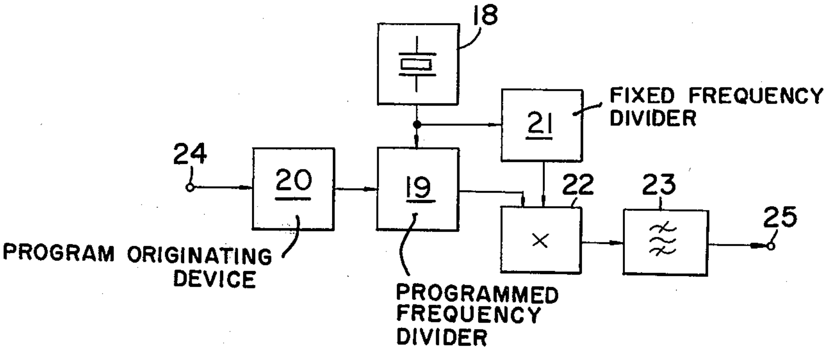
FIG. 3 is a schematic block diagram of one embodiment of a signal generating circuit used in the present invention.

FIG. 3 shows one embodiment of signal generating circuits 2, 3, 7 and 11, wherein 18 designates a reference frequency oscillator, 19 designates a programmed frequency divider, 20 designates a program originating device, 21 designates a fixed frequency divider, 22 designates a mixer, 23 designates a band-pass filter, 24 designates a clock input terminal and 25 designates a signal output terminal.

In the modulator of FIG. 1, the mark signal generating circuit 2 and the space signal generating circuit 3 each generate a signal corresponding to a mark or a space, respectively. The signal passing to the output terminal 5 is switched by the switching circuit 4 based on whether the input data from the data input terminal 1 is either a mark or a space. When the input is a mark, the mark signal generated from the mark signal generating circuit 2 is fed to the output terminal 5. When the input is a space, the space signal generated from the space signal generating circuit 3 is fed to the output terminal 5. The mark and space signal generating circuits 2 and 3 are driven by the clock pulse generated from the clock generating circuit 26 so as to generate signals having patterns synchronized to the clock. The input data is read from the data input terminal 1 in synchronization with the clock.

One embodiment of the mark and space signal generating circuits 2 and 3 has the structure shown in FIG. 3. The output of the reference oscillator 18 is divided by the programmed frequency divider 19 and the fixed frequency divider 21. Both of the divided outputs are mixed by the mixer 22 and are fed through the band-pass filter 23 to be passed from the output terminal 25 as a beat frequency signal between both divided frequencies. The frequency divided ratio of the programmed frequency divider 19 is changed depending upon the program of the program originator 20. The program originator 20 is driven by the clock pulse fed from the clock input terminal 24 so as to originate a program in which the output frequency transmitted from the output terminal 25 is varied in substantially the whole allocated band during one clock period. In the mark signal generating circuit 2 and the space signal generating circuit 3, the programs are different from each other. The programmed frequency divider 19 and the program originator 20 can be relatively simply manufactured by using integrating circuits.

Figure 4:
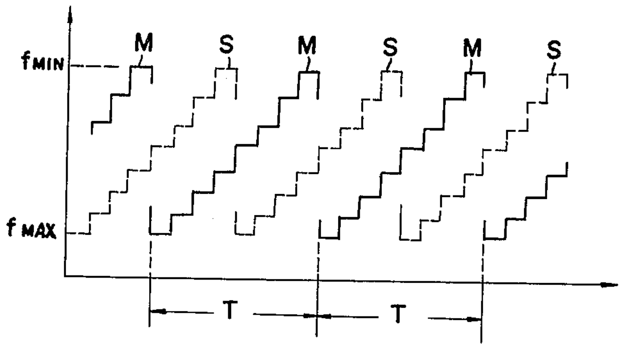
FIG. 4 is a graphical illustration of the frequency shift patterns of mark signals and space signals utilized in the system of the present invention.

Certain examples of the patterns of the frequency shift of the mark signal and the space signal are shown in FIG. 4, wherein M designates the frequency shift pattern of a mark signal, S designates the frequency shift pattern of a space signal, and T designates the period of a clock pulse. The transmitted signals have many frequencies between $f$ min and $f$ max in the cases of a mark and a space. Accordingly, the effect of selective fading is low and also the effect of interference disturbance having a narrow spectrum such as a telegraph signal is low. Only one frequency is transmitted at any one time so that the transmitter average power is equal to the transmitter peak power, whereby it is possible with the present invention to transmit with an average power higher than that of conventional diversity systems in FSK bands.

In order to demodulate the shifted modulated signal in the receiver the demodulator shown in FIG. 2 can be employed. In FIG. 2, the demodulated signal fed from the input terminal 6 can be detected by the two heterodyne detectors 27 and 28. The signals are fed to the mixers 8 and 12 equally divided, and in the mixer 8 the received signal is mixed with the local mark signal transmitted from the local mark signal generating circuit 7 and the mixed signal is passed through the band-pass filter 9 and is detected by an envelope detector 10. On the other hand, in the mixer 12, the received signal is mixed with a local space signal transmitted from the local space signal generating circuit 11 and the mixed signal is passed through the band-pass filter 13 and is detected by an envelope detector 14. The two detector outputs are applied to the code reproducing circuit 15. The received signal is then determined to be either a mark or a space signal, depending upon the value of each of the detector outputs at the time of sampling by the sampling pulse applied to the synchronous control circuit 17. The result is transmitted from the output terminal 16 as the reproduced data. When the output of the detector 10 is higher than the output of the detector 14, the output is considered as a mark signal, and when the output of the detector 10 is lower than the output of the detector 14, the output is considered as a space signal.

The local mark (or space) signal generating circuit may be formed similar to the mark (or space) signal generating circuit as shown in FIG. 3. The program of the program originator 20 is same as that of the mark (or space) signal generating circuit; however, the frequency dividing ratio of the fixed frequency divider 21 is different from that of frequency divider 19. Accordingly, the local mark (or space) signal has a frequency shift pattern in which the frequency is shifted for a constant frequency from the mark (or space) signal. Thus, when the clock of the transmitter is synchronized to that of the receiver the output of the mixer 8 or 12 has a constant frequency. Accordingly, the mark or space signal can be detected without disturbance from noise and (jamming) interference, by corresponding the central frequency of the band-pass filters 9 and 13 to said constant frequency of the output of the mixer 8 or 12 so as to decrease the bandwidth to a desirable minimum.

The local mark signal generating circuit 7 and the local space signal generating circuit 11 are driven by the clock pulse whose phase is controlled the synchronous control circuit 17.

The synchronous control circuit 17 is for synchronizing the outputs of band-pass filters 9 and 13 and the reproduced data so that the phase between the clock pulse and the sampling pulse is controlled whereby the central frequency of the band-pass filter is equal to the average frequency of the output of the filter 9 when the reproduced data is a mark signal and is equal to the average frequency of the output of the filter 13 when the reproduced data is a space signal.

Figure 5:
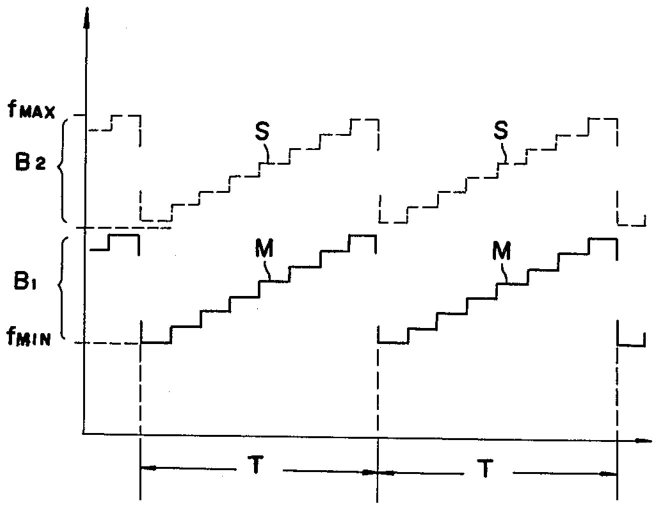
FIG. 5 is a graphical illustration of other frequency shift patterns of mark signals and space signals utilized in the system of the present invention.

In the above illustration, the system shifts both the mark signal and the space signal from $f$ min to $f$ max in substantially the entire band without dividing the band of the mark signal and space signal. It is also possible to provide a frequency shift pattern of a mark signal in substantially the entire band $B_1$ and to provide a frequency shift pattern of a space signal in the entire band $B_2$ as shown in FIG. 5, by dividing the allocated band from $f$ min to $f$ max into two substantially equal bands $B_1$ and $B_2$. Thus, the transmitted signal will contain many frequencies in the band $B_1$ or $B_2$ in both the case of a mark or a space signal. In the signal generating circuits 2, 3, 7, 11 in the disclosed embodiments, the system can be easily attained by changing the pattern of the program controlling the program frequency divider 19 of FIG. 3 depending upon the mark and space signals or by changing the frequency dividing ratio of the fixed frequency divider 21. Accordingly, similar to the system of FIG. 4, the effect of selective fading and interference (jamming) disturbances can be minimized. As only one frequency is transmitted at any one moment, it is possible to transmit the data with a higher average power when compared with a conventional diversity system in the FSK band. In accordance with the system of FIG. 5, the effect against a single wave disturbance is greater by about 3dB than that of the system of FIG. 4, which fact has been confirmed both theoretically and experimentally.

In the above embodiment, an example having two values of the mark and the space as the elements of the code transmitted has been disclosed. However, the invention can be readily applied to cases having N values (N · 2). Also, more than two types of transmitting signals can be used without being limited to the mark signal and the space signal. Each of the transmitter signals have a different frequency shift pattern, and the number of local signals for receiving have a constant frequency difference from the transmitting signal correspond to the number of the transmitting signals, and the number of heterodyne detectors corresponding to each of the local signals are provided, whereby the outputs of all heterodyne detectors are received in the code reproducing circuit so as to determine the code element corresponding to the detector having the maximum output level. As stated above, in accordance with the frequency shift keying system of the invention, the disadvantageous effects of selective fading and interference (jamming) disturbances can be decreased to achieve highly reproducible transmission of data or teletype.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A frequency shift keying method, which comprises the steps of: transmitting N types of signals having different shift patterns which correspond to N values of code elements (N ≥ 2) in substantially the whole allocated band during one clock period;

comparing N types of heterodyne detector outputs provided by N types of local signals for receiving, having each frequency shift pattern synchronized to N types of the transmitting signals, an said local signals each having a constant frequency difference from the transmitting signals; and detecting the heterodyne detector circuit having the maximum output whereby the transmitted code element is detected and reproduced.

2. The frequency shift keying method according to claim 1, wherein said transmitting signals corresponding to each of said code elements and said local signals are formed by programmed frequency dividing from a reference frequency oscillator.

3. The frequency shift keying method according to claim 2, wherein each programmed frequency signal is provided by composing the output of a programmed frequency divider for frequency-dividing the output of said reference frequency oscillator and the output of a fixed frequency divider.

4. The frequency shift keying method according to claim 3, wherein each said programmed frequency divider is controlled by different pattern programs depending upon particular code elements and local signals.

5. The frequency shift keying method according to claim 3, wherein said fixed frequency divider has different frequency dividing ratios depending upon particular code elements and local signals.

6. A frequency shift keying method, which comprises the steps of:

transmitting two types of signals having different shift patterns which correspond to two code elements in substantially the whole allocated band during one clock period;

comparing two types of heterodyne detector outputs provided by two types of local signals for receiving, having frequency shift patterns synchronized to said two types of the transmitting signals, respectively, and said local signals each having a constant frequency difference from said transmitting signals; and detecting the heterodyne detector circuit having the maximum output whereby the transmitted code element is detected and reproduced.

7. A frequency shift keying method for the transmission of N values of code elements (N ≥ 2), which comprises the steps of:

dividing the allocated frequency band into N sub-bands having substantially the same width:

distributing each sub-band to each of said code elements;

transmitting signals having different shift patterns which correspond to each of said code elements and which vary in each whole distributed sub-band during one clock period;

comparing N types of heterodyne detector outputs provided by N types of local signals for receiving, having each of said frequency shift patterns synchronized to said N types of transmitting signals, and said local signals each having a constant frequency difference from said transmitting signals; and detecting the heterodyne detector circuit having the maximum output, whereby the transmitted code element is detected and reproduced.

8. The frequency shift keying method according to claim 7, wherein said transmitting signals corresponding to each of said code elements and said local signals are formed by program frequency dividing from a reference frequency oscillator.

9. A frequency shift keying method for transmitting a mark signal and a space signal, which comprises the steps of:

dividing the allocated frequency band into two sub-bands having substantially the same width;

distributing each sub-band to said mark signal and said space signal;

transmitting signals having different shift patterns which correspond to said mark signal and said space signal and which vary in each whole distributed sub-band during one clock period;

comparing two types of heterodyne detector outputs provided by two types of local signals for receiving, having each of said frequency shift patterns synchronized to said two types of transmitting signals, and said local signals each having a constant frequency difference from said transmitting signal; and detecting the heterodyne detector circuit having the higher output, whereby said transmitted mark or space signal is detected and reproduced.

* * * * *